Feb. 28, 1939.　　　　　C. RAUCH　　　　　2,148,963
PHOTOGRAPHIC CAMERA
Filed Jan. 15, 1937
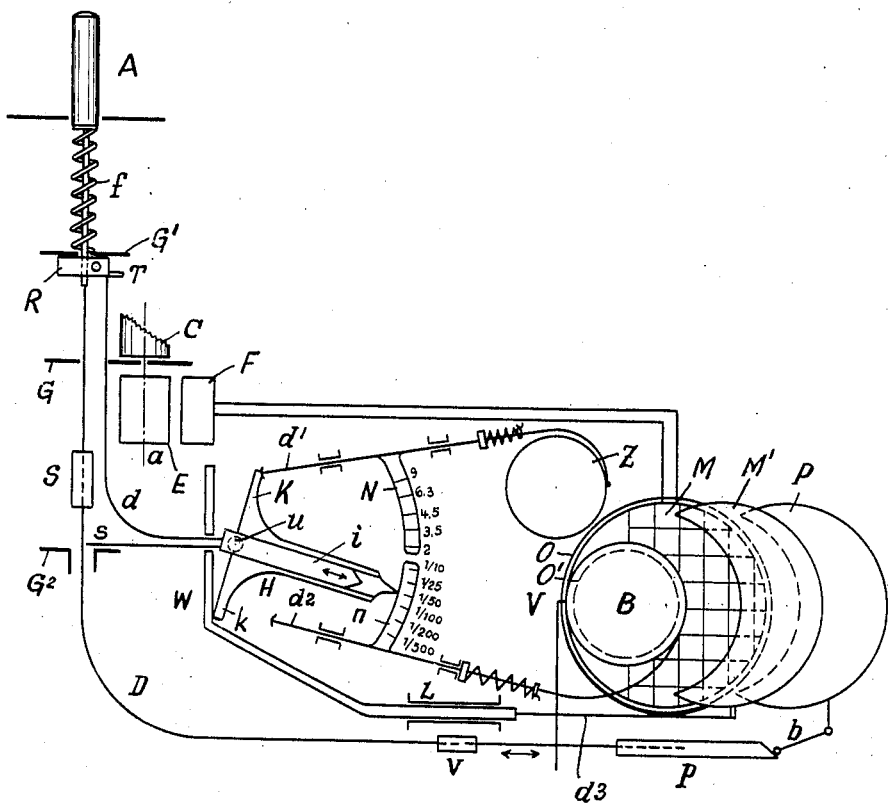
Inventor
Curt Rauch
By
Watson, Coit, Gore & Grindle
Attorneys.

Patented Feb. 28, 1939

2,148,963

UNITED STATES PATENT OFFICE 2,148,963

PHOTOGRAPHIC CAMERA

Curt Rauch, Chemnitz, Germany

Application January 15, 1937, Serial No. 120,788
In Germany January 20, 1936

10 Claims. (Cl. 95—10)

This invention relates to photographic cameras and has for its principal object to provide automatic light sensitive control of the shutter speed, or of the stop aperture adjustment, or of either of these at will.

In motion picture apparatus, it is known to employ a light sensitive element for controlling a check member which limits the stop setting of the objective. Such arrangements, however, are concerned only with the setting of the stop after a previous adjustment has been made of the screening of the light-sensitive element in accordance with the light-sensitivity of the film to be used. Thus, their operation is based on one and the same exposure period or shutter speed.

Now the invention is intended first of all to bring the per se known arrangement into use for such photographic chambers as operated with exposure-periods which are continuously being changed and which vary within wide intervals. Its principal object is to provide for the exposure-period, for any selected stop, being correctly adjusted, automatically and positively, by transmission elements which control the time-setting device and of which the position depends, for example, upon the position for the time-being of the check-device controlled by the light-sensitive cell.

According to a further object, however, instead of commencing with any selected stop and setting the correct exposure-period in accordance therewith, it is furthermore proposed in accordance with the invention, in the converse manner, to set the stop correctly in accordance with any selected exposure-period, this being effected in the same fashion automatically and positively. In practice, both of the separate methods in accordance with the invention are preferably provided for, that in the photographic chamber is so constructed as to be furnished not only with an arrangement for the positive correct setting of the exposure-period in accordance with any previously selected stop, but also, conversely, with an arrangement for the positive adjustment of the stop in accordance with any previously selected exposure-period.

Preferably a combined setting-means for the exposure-period and stop is constructed so as to be controlled by a single selector-device. This device, constructed as a pointer for instance, is adjustable by hand either to the scale-divisions for the stop-aperture or to the scale-divisions for the exposure-period. As the said device is swung, it then, in accordance with the invention, alternatively actuates the time-setting device or the stop-setting device.

At the same time as the selector, adjustable over the particular scales, is swung, a device is operated which effects adjustment of covering members over the light-sensitive cell. The extent of the covering then depends naturally, upon the scale-division to which the pointer is set.

Further, in accordance with the invention, the selector is so constructed that a slide controlled also by the release-device is guided in or upon the selector. This slide can move forwardly and rearwardly. Depending upon the scale marking over which the slide is thus adjusted, it then actuates in its forward movement, either the setting members for the stop-aperture or the setting members for the exposure-period, the actuation being effected completely automatically and positively in correspondence with the length of the release-movement left free, by means of the check-device, under control of the light sensitive cell. The slide guided in or on the selector advantageously determines at the same time, in its forward or rearward movement, the position of a detent-member which only frees the path of movement of the release-device when, at the setting of the selector, the exposure-period or the stop-aperture is not set too small, that is, in other words, that the light available suffices for the exposure.

An arrangement in accordance with the preceding principles allows of the objective and the light-sensitive cell being so arranged that, in the event of the use of additional screening means, such objective and cell can be covered by one and the same screening means; with this arrangement, the filter-protraction factor is caused to be taken into account in the length of the path of movement which influences the mechanical setting members. For example, if the objective and the light-sensitive cell are arranged one in the other as eccentric circles then any screening means placed in front can influence both elements simultaneously. Consequently, the setting means for the exposure-period automatically takes account of any changes. As screening means, use may be made of the normal light-filter or of arrangements which cover a part of the light sensitive cell, such part corresponding to the protraction-factor of the filter. By "protraction-factor" is meant the ratio by which the exposure conditions must be modified in order to compensate for the filter.

Finally, provision is preferably made also for the release-device to remove the protective cover from the light-measuring cell in order that the automatic setting of the stop-aperture or of the exposure-period may take place. The release-device may also be coupled with the film-feeding means and with the shutter-setting means or with one of these two means.

A single purely diagrammatic example of how the invention may be carried into effect is more fully represented in the accompanying drawing:—

In the drawing, no particular camera-model is intended. Self-evident parts, such as mountings, connections and so forth and also the photographic apparatus proper are omitted for the sake of greater clarity; moreover, such parts as in practice may be located one behind the other are shown side by side. The drawing is only intended to indicate the basic ideas for, moreover, a combined arrangement with a single button control.

The movement of the release-button A is generally transmitted by the wires D and $d$ somewhat after the fashion of the usual wire release-device. Attached to the free end of D is a control-plate $p$ which removes the protective cover P from the light-measuring cell M by means of the lever $b$. When this has occurred, the control-plate can simply slide as far as is required under $b$. The cover P remains open, however, as long as A is depressed.

Upon the depression of A, the wire D carries with it the slipping clutch R clipped upon it, and also the wire $d$ and so forth and the stop-pin T, until the stop-pin encounters the control-cylinder C. There, the parts connected to the slipping clutch R have their movement arrested. The slipping clutch R is so-called because whilst it is clipped on to the stem of the press button A with such force as to enable it to be carried up and down with such stem for normal working, nevertheless when it is arrested in downward movement by the cylinder C or in upward movement by a stop G' it slips upon the stem of the button A and permits the latter to continue in its movement. The control-cylinder may be secured upon the same spindle $a$ as carries the rotatable coil E. These parts are turned to a greater or less extent on the spindle $a$ according to the strength of the light, which is converted by the light-sensitive cell into an electric current. This turning occurs under the influence of a magnet F which acts upon the rotatable coil E.

In the illustrated position of the control-cylinder C, the strength of the light is so little that it does not suffice for an exposure with the time-period provided for on the apparatus or selected in the previous setting. A longer exposure must therefore be given as for example a time exposure. Under-exposures, well known to be one of the greatest bugbears of photographers, are impossible upon actuation of the apparatus by means of the button A. With the cylinder C in the position illustrated it arrests the clutch device R after a very small depression of the button A, the clutch device being arrested on the highest point of the control-cylinder. At the same time, the movements of the wire $d$, a bolt $i$ and a locking wire $s$ are also terminated, as these are all permanently connected together and to the clutch device R. The stem of the button A then slips through the clutch device R and forces down the wire D carrying a locking stop S. The latter then encounters the locking wire $s$ which still lies in its path. Further movement is prevented by one of the counter-stops $G^2$ upon which the wire $s$ rests and the shutter remains un-released.

If, however, the strength of the light is sufficient for a pre-selected setting, then the control-cylinder C is turned accordingly and the parts permanently connected to the slipping clutch R, that is including the locking wire $s$, execute a larger movement, since the stop T only encounters a lower part of the control cylinder C. The locking stop S can then move unhindered clear of the opening in $G^2$ to permit the stop S to pass through and the stop $v$, likewise mounted on the wire D, causes the objective-shutter V to be released. In order that the light control-parts may not be damaged, they are so arranged that they move freely at first, but are then relieved of pressure because the latter is transferred by them to a fixed counter-stop G.

Before an exposure, the photographer has to decide whether he attaches greater value to a certain period of exposure (for instance with moving objects) or to a certain stop-aperture (if sharpness of definition is the decisive factor). In the first case, he sets the point of the indicating member or selector H, which can be swung about a pivot U, to $\frac{1}{50}$th sec. for example as shown in the drawing. The arm K, which is connected to the selector, then presses on the wire $d^1$ and transmits the required exposure-period to the time-regulating-device Z. At the same time, the other arm $k$ presses against the cranked arm W which is caused to slide longitudinally in the guide L and adjust the extent of uncovering of the light-sensitive cell M by the plate M' through the intermediary of $d^3$ to such extent as is necessary for the predetermined exposure-period.

If A is depressed after this preliminary setting and the light available is sufficient, then the wire $d$ pushes the bolt $i$ rightwardly out from the selector H. The said bolt presses against the arm $n$ on the wire $d^2$ and adjusts the stop aperture precisely in the manner required by the available light with the selected exposure-period. The wire D, sliding further, then releases by means of $v$ the objective-shutter V, thus exposing the objective lens O. Upon removal of the finger from A, D is drawn back by the spring $f$ into the initial position, and thereby carries with it the slipping clutch R and so forth; also all the other parts return to their previous positions. Similarly to the cover P of the light-sensitive cell M, the cover of the objective may naturally also be removed and replaced by the same movement.

If the photographer, after the described exposure, desires to select another adjustment, for the purpose of obtaining, say, a certain sharpness of definition or depth, then it is sufficient merely to swing the point of the selector H to one of the stop-members indicated on the segment N. The arm $k$ then presses upon $d^2$ and thus adjusts the stop B to the desired extent, whilst the other arm K effects, in the above-described fashion by means of the cranked arm W, the appropriate uncovering of the light-sensitive cell. The finger-pressure upon A is again transmitted by the parts R, $d$ to the bolt $i$ which now, however, influences the arm N and, through $d^1$ sets the correct exposure-period for the previously selected stop.

In order to take account positively also of the sensitivity of the particular photographic material exposed, a further plate $o$, comprising a more or less dense grey filter suited to the material exposed is placed in front of the light sensitive cell. The filter-factor for exposure filters (green, yellow, red and so forth) is positively taken into account by reason of the fact that, owing to the construction, the objective and light-sensitive cell are covered together by the same filter, unless it is desired to use two separate filters, or the filter-frames comprise parts which uncover a part of the measuring cells.

It appears to be advantageous to arrange the preliminary setting means either on the top or back of the photographic apparatus and also to make a light-sensitive indicator or the control-cylinder, naturally under glass for protection, visible from there. If it is desired to dispense with the indicator, then the control-cylinder should be provided with corresponding figures or with a mark. If only light-measurements are to be effected, then A is depressed so far only that the cover of the light-sensitive cell is removed or opened.

If the construction of the photographic apparatus does not permit of the setting elements remaining visible during the exposure, then telltale devices may be provided in simple fashion, for instance in the view-finder or in its vicinity, which allow the state of the main setting and, if desired, also the preliminary setting to be learned at once.

In the arrangement shown, in order to simplify the illustration, it has been assumed that the photographic apparatus in question is already provided with positive film-feeding means coupled in the usual fashion with the shutter-setting movement. In this case, the following are necessary to effect operation:—

(1) Preliminary setting of time or stop by the selector H, (2) Film feed and setting of the shutter V, (3) Depression of the button A whereby all else necessary is effected.

The arrangement is more perfect if the operation is confined to (1) and (3) only and the film-feed and the setting of the shutter are also effected in suitable manner by the transmission element D; in this case a lever would be preferable in place of the button A. From practical considerations, it may be desirable in some cases to separate the individual tasks in appropriate fashion, that is to use several buttons, levers or the like which, however, are located closely side by side and can be actuated by one or two fingers of the same hand; one movement may over-run the other. For example, the middle finger might effect the film-feed and setting of the shutter and the index finger the other operations described and the first button depressed might be held automatically until the other button had released the objective-shutter. An arrangement wherein A is depressed twice may also be adopted. The modifications may be thus multiplied at will and may be used not only for film, but also for plate-cameras. If one of the arrangements described in this paragraph is selected, then the photographer is enabled to make a largish series of exposures particularly quickly one after another, it being possible for him, moreover, to observe the object of the exposures continuously through the view-finder or matte disc or screen.

It is important also that, after the absolutely necessary preliminary setting by the selector, all the other necessary manipulations (which otherwise, with little practice or in a hurry, may be readily overlooked) are combined by a suitable arrangement in, as far as possible, one single movement of one or two fingers and, due to the automatic main setting, perfect results are ensured reliably, particularly quickly one after another and without failure.

In the above-described arrangement, a rotary control-cylinder C and a slidable stop R were assumed for the main setting. Naturally, the reverse arrangement may also be employed, that is a stop of little weight may be secured to the rotatable coil E or its spindle and the control-cylinder C may be slidably secured to the clutch device R. Suitably shaped discs may also be used instead of cylinders. Furthermore, especially small and light arrangements are made possible by appropriate lever transmission-means. In this respect also, many modifications are possible.

The finger-movement should take place gently in order that the control-cylinder C shall have a short time free for its deflection. This can also be achieved positively, for example by an air-brake or dash pot.

For the film-feed and the shutter-setting, or one of the two, it may be preferred, in place of control or operation by the release-device, to connect them also to the selector and to set them in operation at the same time as the latter is moved. This may, for example, have the advantage that a longer setting movement is available than with the release device.

Any of the parts, such as the slide $i$ of the selector H and/or the shutter $vV$ and the cover $pbP$ of the cell, may be operated by simple wires such as $d$ or D instead of by the more complicated actuating elements, such wires, where necessary, being under control of a slipping clutch device such as R.

I claim:—

1. In a photographic camera, the combination of an objective lens, an aperture stop, means for adjusting said stop, a variable speed shutter, means for adjusting the speed of said shutter, a light sensitive cell, variable arresting means under the control of said cell, selective means for optionally actuating either of said adjusting means, means for releasing said shutter, and means associated with said shutter releasing means for automatically actuating said other adjusting means to an extent determined by the position of said variable arresting means.

2. In a device according to claim 1, an aperture scale and a shutter speed scale associated with said selective means, said last means being provided with a pointer adapted to cooperate selectively with either of said scales.

3. In a photographic camera, the combination of an objective lens, an aperture stop, means for adjusting said stop, a variable speed shutter, means for adjusting the speed of said shutter, a light sensitive cell, variable arresting means under the control of said cell, selective means for optionally actuating either of said adjusting means, means associated with said selective means for exposing said light sensitive cell to an extent determined by the optional adjustment performed, means for releasing said shutter, and means associated with said shutter releasing means for automatically actuating said other adjusting means to an extent determined by the position of said variable arresting means.

4. In a device according to claim 1, locking means normally adapted to prevent the release of said shutter, and means under the control of said light sensitive cell for rendering said locking means inoperative whenever the quantity of light affecting said cell exceeds a predetermined value.

5. In a device according to claim 1, a cover normally adapted to conceal said light sensitive cell, and means associated with said shutter releasing means for displacing said cover during the initial portion of the travel of said shutter releasing means.

6. In a photographic camera, the combination of an objective lens, an aperture stop, means for adjusting said stop, a variable speed shutter, means for adjusting the speed of said shutter, a light sensitive cell, variable arresting means under the control of said cell, selective means for optionally actuating either of said adjusting means, means for releasing said shutter, means associated with said shutter releasing means for automatically actuating said other adjusting means to an extent determined by the position of said variable arresting means, movable masking means associated with said light sensitive cell, and means operatively connecting said selective means and said masking means.

7. A device according to claim 1, said light sensitive cell being arranged to partially surround said objective lens.

8. A device according to claim 1, said actuating means for performing said automatic adjustment comprising a slidable member associated with said selective means and means connecting said slidable member with said shutter releasing means, said slidable member being adapted to act selectively on either of said adjusting means during the initial portion of the travel of said shutter releasing means.

9. In a photographic camera, the combination of an objective lens, an aperture stop, means for adjusting said stop, a variable speed shutter, means for adjusting the speed of said shutter, a light sensitive cell, variable arresting means under the control of said cell, selective means for optionally actuating either of said adjusting means, means associated with said selective means for exposing said light sensitive cell to an extent determined by the optional adjustment performed, a control button, means associated with said control button for automatically actuating said other adjusting means to an extent determined by the position of said variable arresting means, and means associated with said control button for releasing said shutter after said automatic adjustment has been performed.

10. In a photographic camera, the combination of an objective lens, an aperture stop, means for adjusting said stop, a variable speed shutter, means for adjusting the speed of said shutter, a light sensitive cell, variable arresting means under the control of said cell, selective means for optionally actuating either of said adjusting means, means associated with said selective means for exposing said light sensitive cell to an extent determined by the optional adjustment performed, a control button, means associated with said control button for automatically actuating said other adjusting means to an extent determined by the position of said variable arresting means, means associated with said control button for releasing said shutter after said automatic adjustment has been performed, and means under the control of said light sensitive cell for preventing the release of said shutter whenever the quantity of light affecting said cell is below a predetermined value.

CURT RAUCH.